(12) United States Patent
Kopczynski

(10) Patent No.: US 6,279,931 B1
(45) Date of Patent: Aug. 28, 2001

(54) VEHICLE WITH VERTICALLY MOVABLE AND VERTICALLY PULSATING WHEELS

(76) Inventor: John F. Kopczynski, 1671 Sweeney St., North Tonawanda, NY (US) 14120

( * ) Notice: Subject to any disclaimer, the term of this patent is extended or adjusted under 35 U.S.C. 154(b) by 0 days.

(21) Appl. No.: 09/078,926

(22) Filed: May 14, 1998

Related U.S. Application Data

(62) Division of application No. 08/521,546, filed on Aug. 30, 1995, now Pat. No. 5,797,607.

(51) Int. Cl.$^7$ ................................ B60G 7/00; B60P 7/00; B62D 7/00
(52) U.S. Cl. ........................................................ 280/124.111
(58) Field of Search ..................... 280/124.111, 124.112, 280/124.113, 124.127, 43.18, 43.22, 43.23; 180/8.3, 209

(56) References Cited

U.S. PATENT DOCUMENTS

| | | | | |
|---|---|---|---|---|
| 2,473,903 | * | 6/1949 | Purifoy | 318/440 |
| 3,563,566 | * | 2/1971 | Weber | 280/124 |
| 3,689,103 | * | 9/1972 | Meulendyk | 280/124 |
| 3,700,059 | * | 10/1972 | Sutton | 180/30 |
| 3,703,298 | * | 11/1972 | Laverda | 280/6 |
| 4,152,004 | * | 5/1979 | Schroder | 280/111 |
| 4,492,389 | * | 1/1985 | Wyatt et al. | 280/704 |
| 4,647,067 | * | 3/1987 | Paquettel et al. | 280/676 |
| 4,964,480 | * | 10/1990 | Kopczynski | 180/22 |

\* cited by examiner

*Primary Examiner*—Kevin Hurley
*Assistant Examiner*—Kevin McKinley
(74) *Attorney, Agent, or Firm*—Joseph P. Gastel

(57) ABSTRACT

An all-terrain vehicle including centrally pivoted bogies on opposite sides of the vehicle body, a primary yoke mounted on the vehicle body and extending crosswise to the vehicle body for coupling the bogies to each other, a secondary yoke mounted on the vehicle body and connected to the vehicle body by hydraulic cylinders at opposite ends thereof, and a selectively actuatable clutch for coupling the secondary yoke to the primary yoke so as to cause the hydraulic cylinders to drive both yokes a desired amount to positively move the bogies to a desired position, and hydraulic circuitry coupled to the hydraulic cylinders for applying a pulsating action to the bogies which is transmitted to the vehicle wheels mounted on opposite ends of the bogies for increasing traction of the wheels on surfaces such as snow, ice, mud and sand. The pulsating action can be applied either when the bogies have been moved to and maintained in a predetermined position or when the bogies are freely pivoting as the vehicle is passing over terrain. A conventional vehicle which includes structure for vertically pulsating individual wheels and changing their elevation relative to the vehicle body.

49 Claims, 12 Drawing Sheets

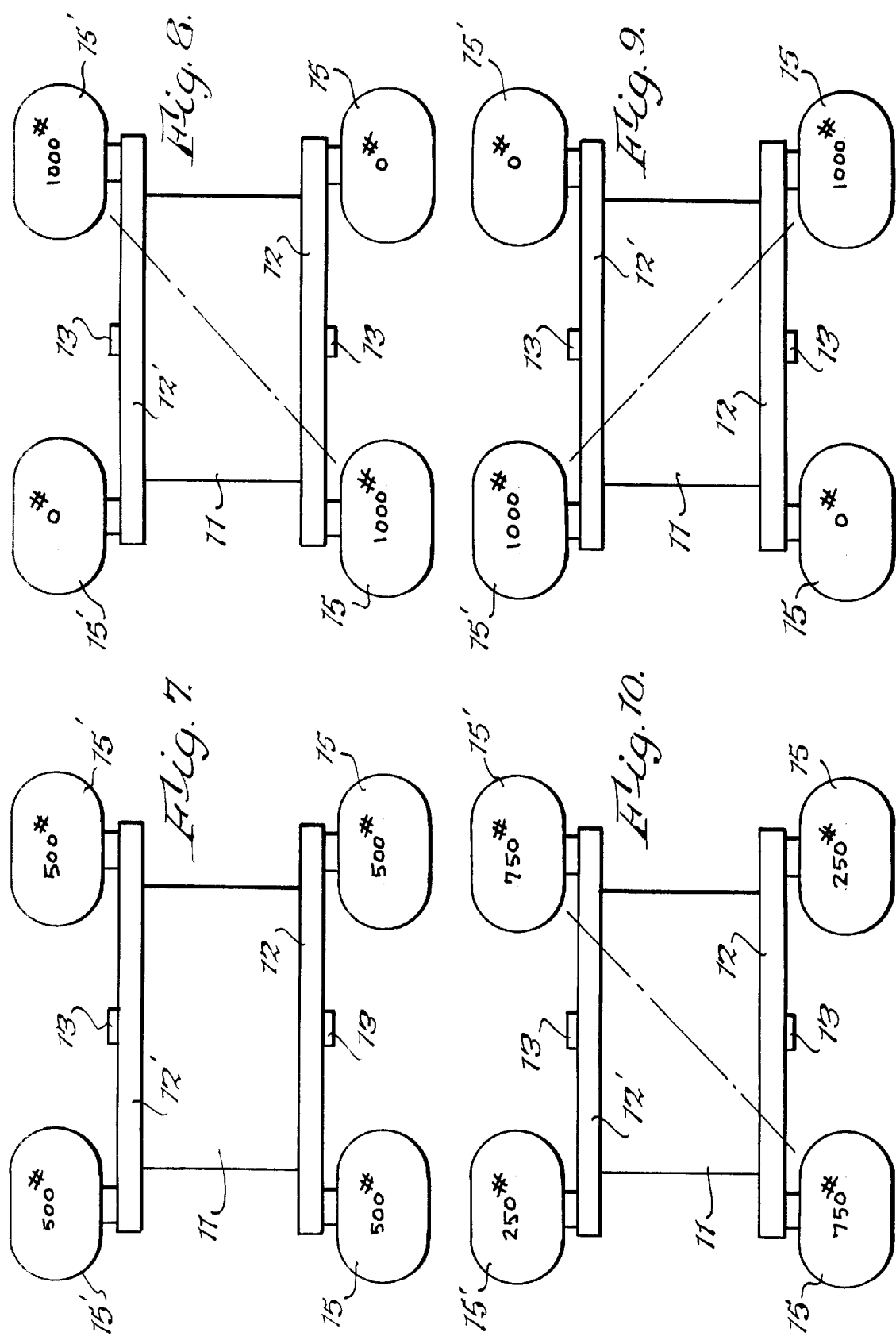

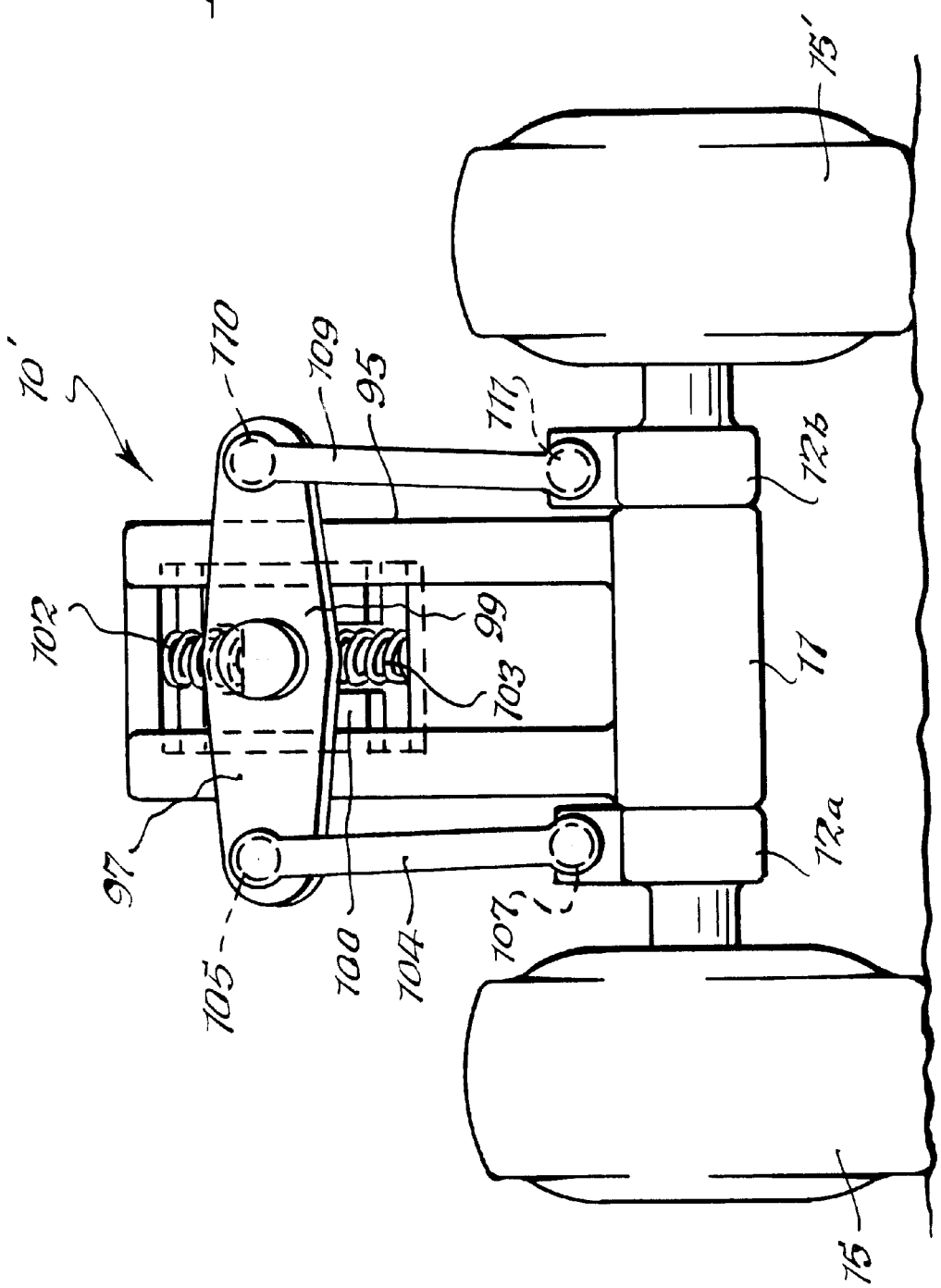

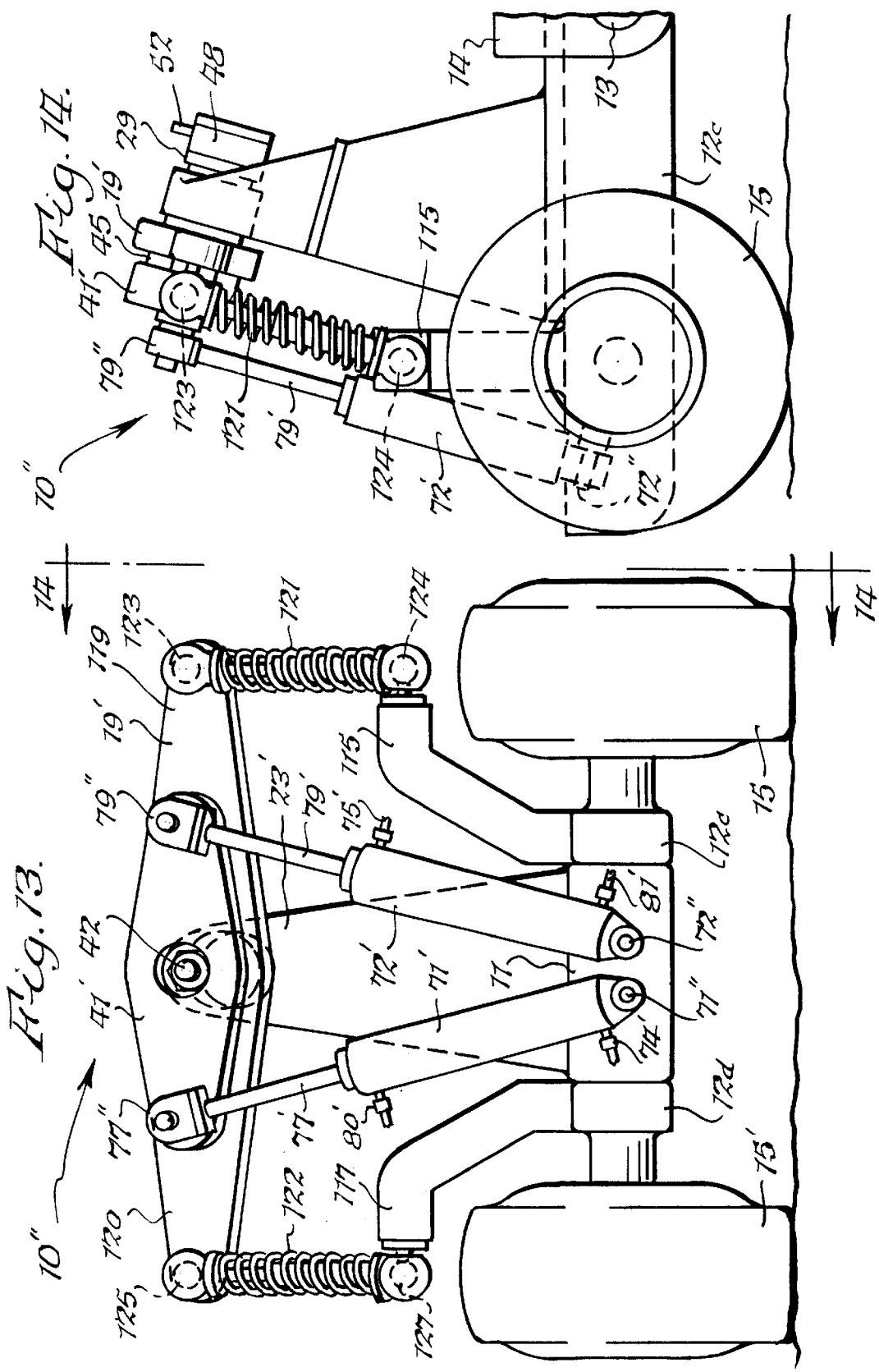

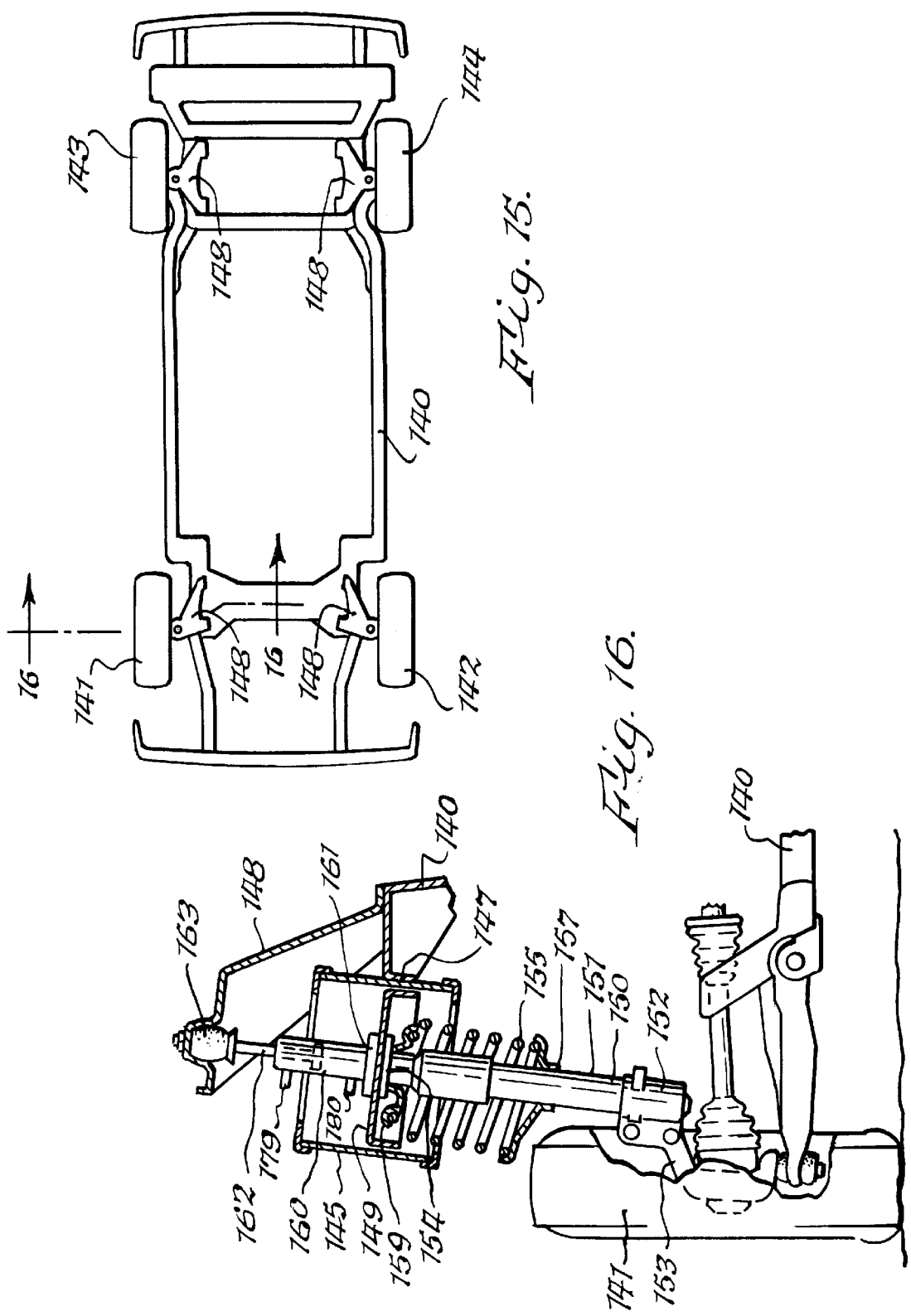

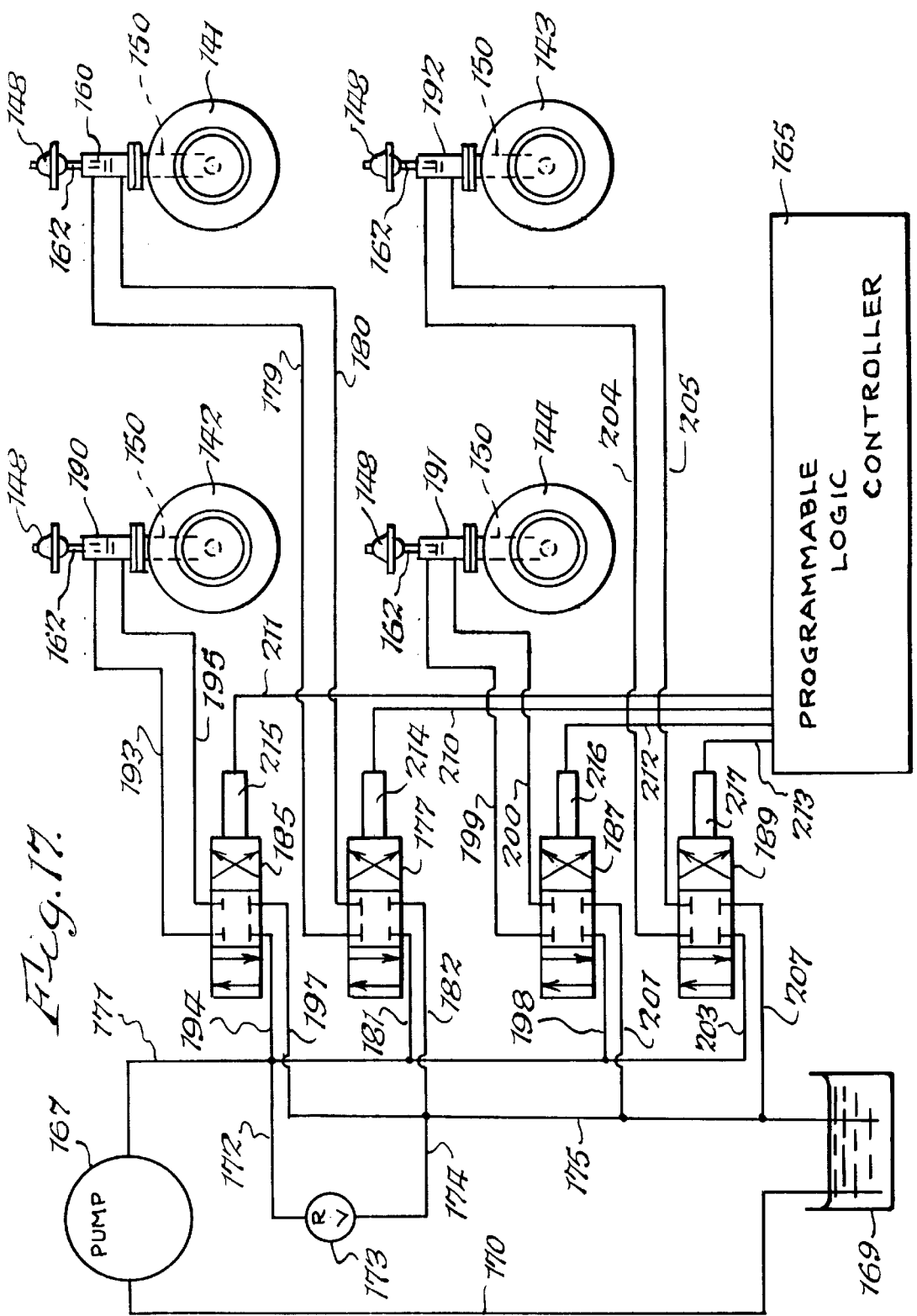

VEHICLE WITH VERTICALLY MOVABLE AND VERTICALLY PULSATING WHEELS

This is a division, of application Ser. No. 08/521,546 filed Aug. 30, 1995 now U.S. Pat. No. 5,797,607.

BACKGROUND OF THE INVENTION

The present invention relates to an all-terrain vehicle and to a conventional vehicle which includes structure for selectively raising or lowering the vehicle wheels to a selectable height to pass over an obstruction and/or for producing a pulsating motion of selectively variable frequency and amplitude to improve traction on various surfaces including but not limited to mud, sand, snow and ice.

By way of background, in prior U.S. Pat. No. 4,964,480, an all-terrain vehicle is disclosed wherein pivotal bogies on opposite sides of the vehicle each have a pair of wheels mounted on opposite ends thereof. The bogies are interconnected by a cross link or yoke so that the pivoting of each link is transmitted to the other link to thereby simultaneously raise or lower diagonally opposite wheels. However, the pivoting of the bogies is effected only by the wheels traveling over the ground. There is no structure for positively pivoting the bogies to cause any one of the wheels mounted on opposite ends thereof to be raised or lowered to a selectable height to pass over obstruction. Furthermore, there is no teaching of imparting a pulsating motion of selectable frequency and amplitude to the wheels to improve traction on all surfaces such as snow, ice, mud and sand.

SUMMARY OF THE INVENTION

It is one object of the present invention to provide a vehicle in which a vertical pulsating motion can be applied to the vehicle wheels to improve traction on various surfaces including but not limited to mud, sand, snow and ice.

Another object of the present invention is to provide a vehicle in which a wheel can be selectively raised to a desired height to pass over an obstruction which is blocking it.

Yet another object of the present invention is to provide a vehicle in which a vehicle wheel can not only be raised to a selectable height to pass over an obstruction, but also a vertical pulsating motion can also be applied to the vehicle wheels after the wheel has been raised to improve traction.

A further object of the present invention to provide an improved all-terrain vehicle having centrally mounted bogies on opposite sides thereof each carrying wheels at opposite ends thereof with the bogies being interconnected by a cross link or yoke and having a motor for pivoting the yoke to positively raise one of the wheels to a selectable height for passing over an obstruction. Other objects and attendant advantages of the present invention will readily be perceived hereafter.

The present invention relates to a vehicle comprising a body, a plurality of wheel supports on said body, a plurality of wheels on said wheel supports, and selectively actuatable pulsating motor means coupled between said body and at least one of said wheel supports for pulsating at least one of said wheels in a vertical direction.

The present invention also relates to a vehicle comprising a body, a plurality of wheel supports on said body, a plurality of wheels on said wheel supports, and motor means for selectively substantially simultaneously pulsating certain of said wheels in a vertical direction and simultaneously changing their elevation relative to said body.

The present invention also relates to a vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, first connecting means movably connecting said second outer end portions of said yoke to said first ends of said elongated links, second connecting means movably connecting said first outer ends of said bogies to said second ends of said elongated links, and selectively actuatable motor means for positively pivoting said yoke to thereby positively pivot said bogies coupled to said yoke.

The present invention also relates to a vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, first connecting means movably connecting said second outer end portions of said yoke to said first ends of said elongated links, second connecting means movably connecting said first outer ends of said bogies to said second ends of said elongated links, laterally extending arms at certain of said first ends of said bogies, outer ends on said laterally extending arms located substantially above certain of said wheels, and said second connecting means being located at said outer ends of said laterally extending arms.

The present invention also relates to a vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, first connecting means movably connecting said second outer end portions of said yoke to said first ends of said elongated links, second connecting means movably connecting said first outer ends of said bogies to said second ends of said elongated links, and wherein said vehicle includes first and second ends, and wherein said standard is mounted proximate said first end of said body, and wherein said bogies are connected to said first elongated links proximate said first end of said body, a second standard mounted proximate said second end of said body, a second yoke pivotally mounted on said second standard and extending crosswise of said body, outer end portions on said second yoke, second elongated links having first and second ends, third connecting means movably connecting said outer end portions of said second yoke to said first ends of said second elongated links, and fourth connecting means movably connecting said bogies to said second ends of said second elongated links proximate said second end of said body.

The various aspects of the present invention will be more fully understood when the following portions of the specification are read in conjunction with the accompanying drawings wherein:

BRIEF DESCRIPTION OF THE DRAWINGS

FIG. 7 is a schematic view showing the distribution of the weight of the vehicle on its four wheels when the bogies are freely pivotable on the vehicle body;

FIG. 8 is a schematic view similar to FIG. 7 but showing the vehicle weight transitionally shifted to a pair of diagonal wheels by the actuation of the secondary yoke;

FIG. 9 is a schematic view similar to FIG. 8 but showing the vehicle weight transitionally shifted to the wheels which are diagonally opposite to the wheels shown in FIG. 8;

FIG. 10 is a further schematic view showing the transitory distribution of the vehicle weight to the vehicle wheels;

FIG. 12 is an end elevational view taken substantially in the direction of arrows 12—12 of FIG. 11;

FIG. 13 is a front elevational view of still another embodiment of the present invention wherein the bogies are extended to connect to the yoke over the approximate center lines of the vehicle wheels;

FIG. 14 is a fragmentary side elevational view taken substantially in the direction of arrows 14—14 of FIG. 13;

FIG. 15 is a schematic plan view of a vehicle having four independently suspended wheels;

FIG. 16 is a fragmentary cross sectional view taken substantially along line 16—16 of FIG. 15 and showing a suspension which includes structure for both raising and lowering a wheel as well as applying a pulsation thereto; and FIG. 17 is an electro-hydraulic schematic showing how the wheel suspensions can be controlled to provide raising, lowering, or pulsation to the various wheels.

DESCRIPTION OF THE PREFERRED EMBODIMENTS

Figure 1:
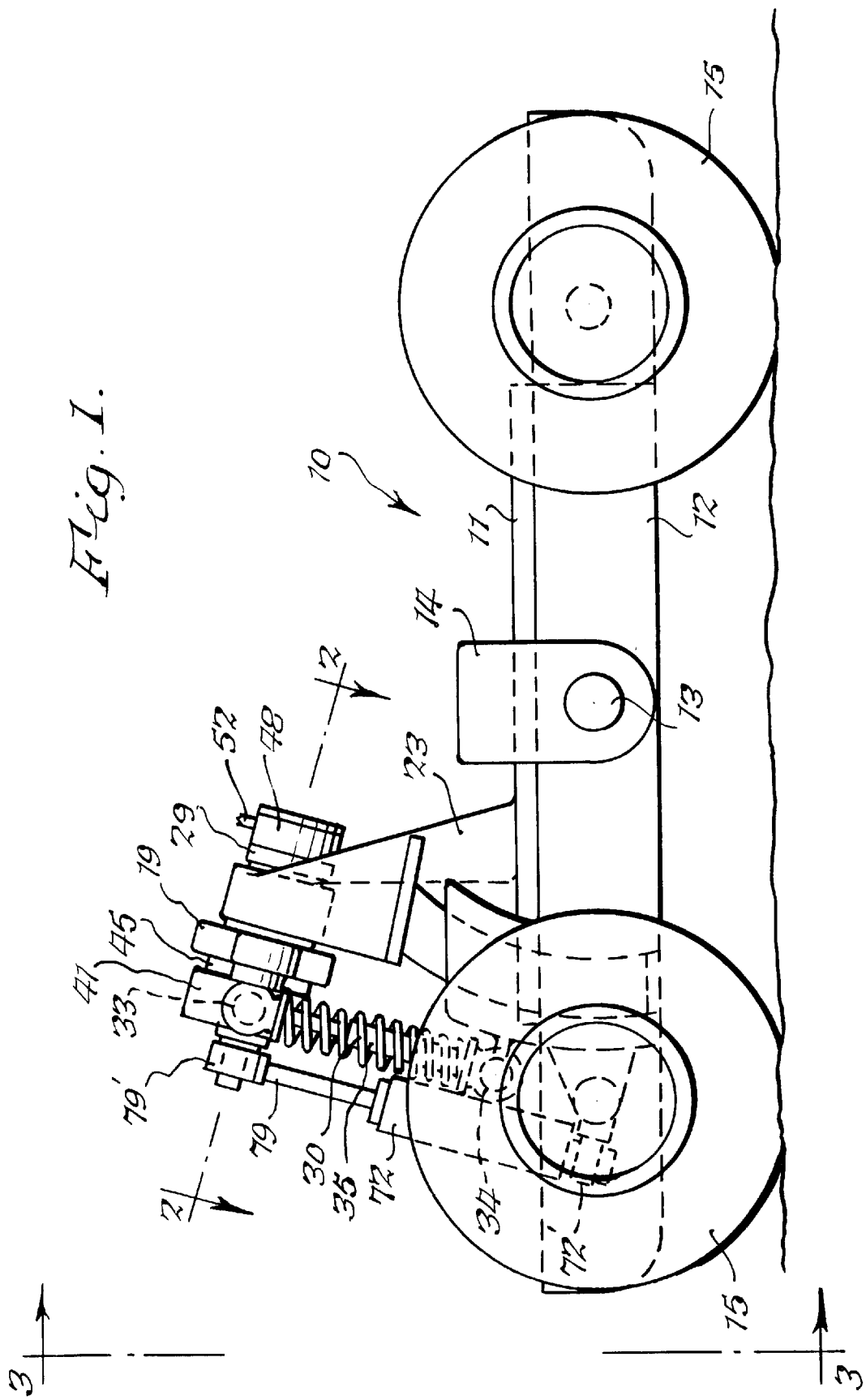
FIG. 1 is a side elevational view of the improved all-terrain vehicle of the present invention.

Summarizing briefly in advance, the all-terrain vehicle 10 of the present invention is an improvement over the all-terrain vehicle disclosed and claimed in my prior U.S. Pat. No. 4,964,480 dated Oct. 23, 1990, which is incorporated herein by reference, thereby obviating the necessity for a detailed description of various features which can be included for operating the vehicle and which are not necessary for an understanding of the present invention.

Summarizing further in advance, one embodiment of the improved all-terrain vehicle 10 of the present invention includes structure for positively selectively driving the bogies which are otherwise mounted on the vehicle body for free pivotal movement in following the contour of the terrain. This driving action can be effected by causing the diagonally opposite wheels of the vehicle to be simultaneously lifted or lowered to traverse terrain and also by driving the bogies in a vertical pulsating manner to rapidly shift the weight of the vehicle between the opposed diagonal pairs of wheels to thereby facilitate the passage of the vehicle across terrain, such as mud, ice, snow or sand, over which the vehicle may not otherwise have the desired traction. In another embodiment of the invention, structure is provided to cause independently mounted wheels of a conventional vehicle to be selectively pulsated vertically to increase traction as well as to be raised or lowered.

The improved all-terrain vehicle 10 includes a vehicle body 11 having mirror image bogies 12 and 12' mounted on pivot shafts 13 and 13', respectively, which extend outwardly from body 11 and which are supported in frame members 14 and 14', respectively. Wheels 15 and 15' are mounted on the outer ends of links or bogies 12 and 12', respectively, on axles 17 and 17', respectively. The wheels 15 and 15' can be driven by the structure disclosed in prior U.S. Pat. No. 4,964,480 which, as noted above, is incorporated herein by reference.

Figure 2:
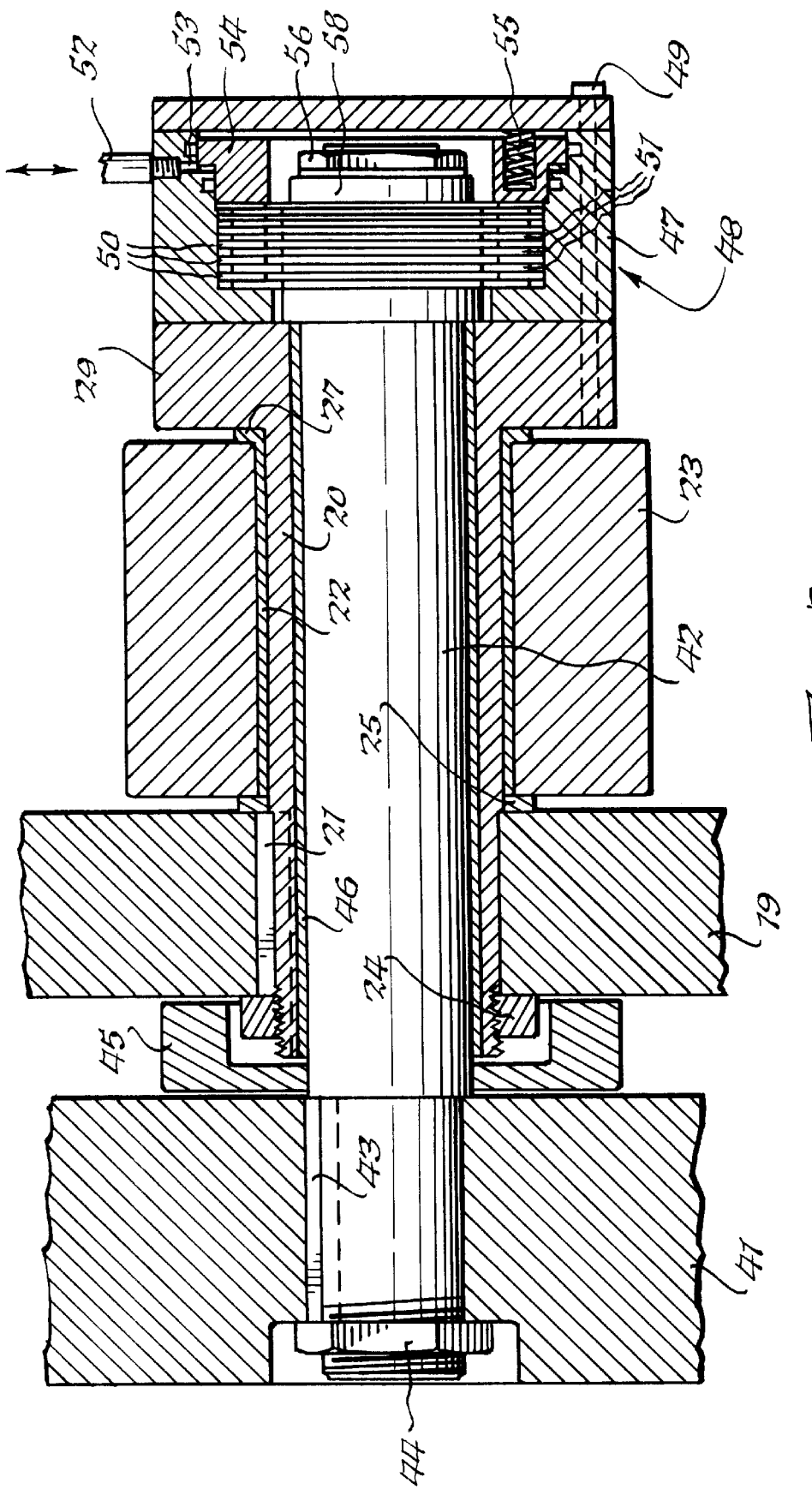
FIG. 2 is a fragmentary cross sectional view taken substantially along line 2—2 of FIG. 1 and showing primarily the clutch arrangement for coupling a secondary yoke to the primary yoke to thereby cause it to raise or lower the wheel mounting bogies which are normally freely pivotable on the vehicle body.
Figure 3:
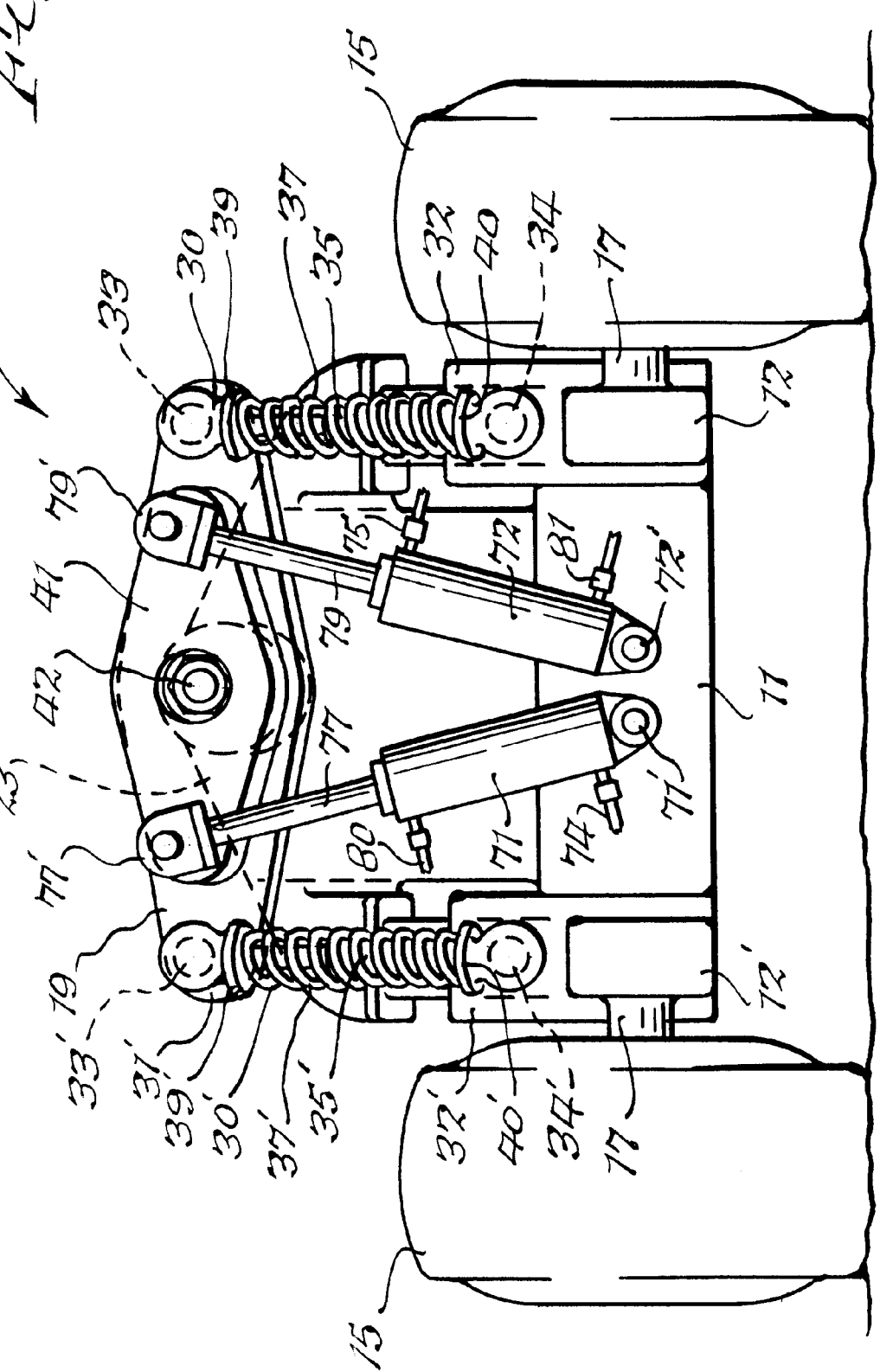
FIG. 3 is a front elevational view of the improved all-terrain vehicle taken substantially in the direction of arrows 3—3 of FIG. 1.
Figure 4:
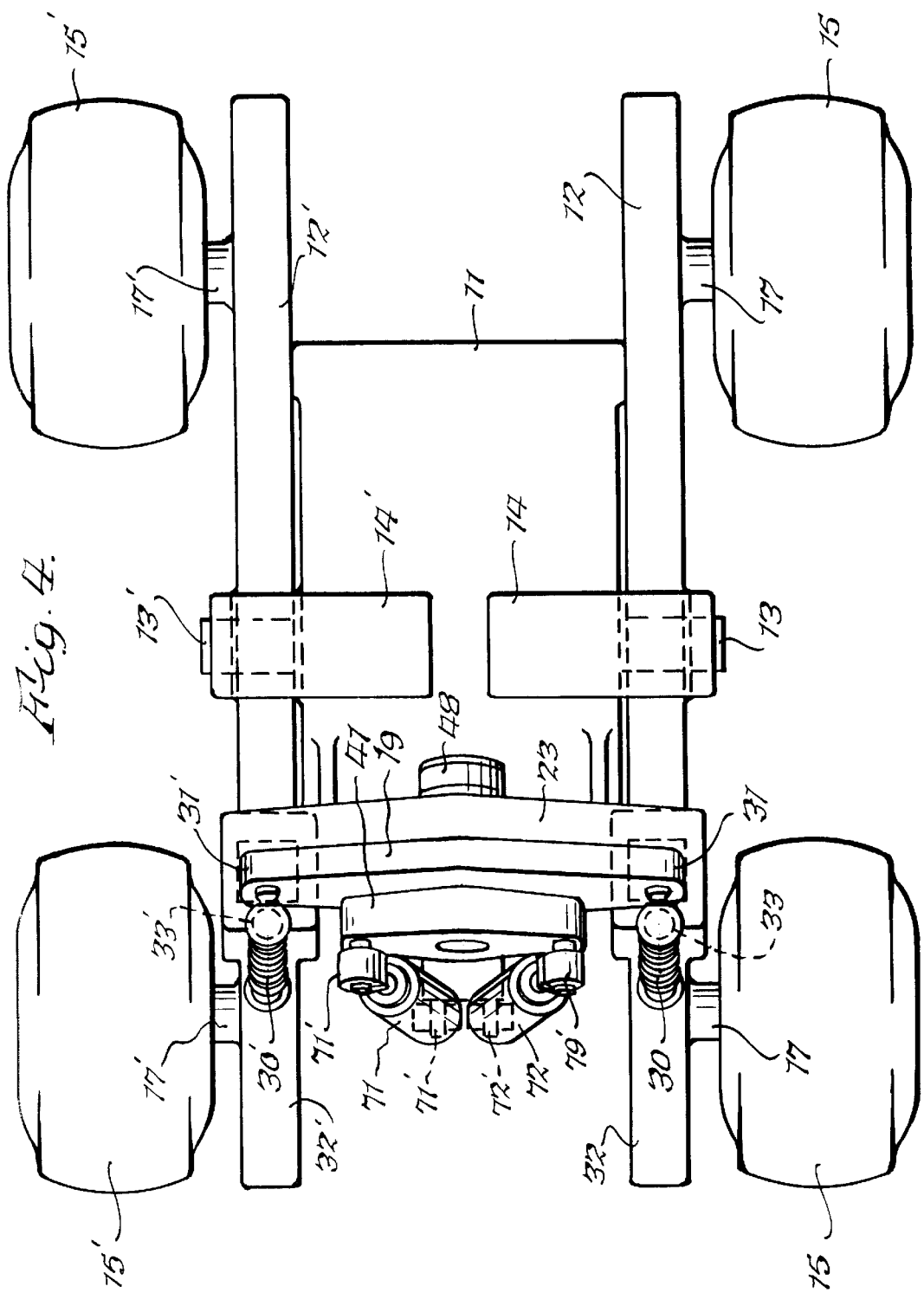
FIG. 4 is a plan view of the all-terrain vehicle of FIG. 1.

The bogies 12 and 12' are coupled to each other through a primary yoke 19 which is keyed to hollow shaft 20 (FIG. 2) by key 21. Shaft 20 is rotatable in bearing 22 mounted in standard 23 which extends upwardly from vehicle body 11. A nut 24 is threaded onto the end of outer shaft 20 to maintain it in assembled relationship relative to standard 23. A thrust bearing 25 is located between standard 23 and primary yoke 19, and a thrust bearing 27 is located between standard 23 and enlarged portion 29 of outer shaft 20. Links 30 and 30' are coupled between the outer ends 31 and 31', respectively, of yoke 19 and ends 32 and 32' of bogies 12 and 12', respectively. Links 30 and 30' include upper ball joints 33 and 33', respectively, which are suitably coupled to outer ends 31 and 31', respectively, of yoke 19. Links 30 and 30' also include ball joints 34 and 34', respectively, which are coupled to bogies 12 and 12', respectively. Links 30 and 30' include shock absorbers 35 and 35' which are encircled by springs 37 and 37', respectively. The ends of springs 37 bear against collars 39 and 40 associated with ball joints 33 and 34, respectively, and the ends of spring 37' bear against collars 39' and 40' associated with ball joints 33' and 34', respectively. Thus, the ends 32 and 32' of bogies 12 and 12', respectively, are resiliently coupled to the outer ends 31 and 31' of primary yoke 19 which is pivotally mounted on standard 23. By virtue of the fact that the bogies 12 and 12' are freely pivotally mounted on pivot shafts 13 and 13', respectively, the bogies will pivot as the vehicle traverses uneven terrain, and the diagonally opposite wheels on the bogies will either simultaneously rise or fall relative to the vehicle body, as fully disclosed in the above-mentioned U.S. Pat. No. 4,964,480.

There are certain circumstances wherein it is desirable to positively raise or lower one of the four vehicle wheels 15 or 15' to pass over an obstacle, such as a wall, which the wheel otherwise could not climb. To this end a secondary yoke 41 is provided for selective coupling to primary yoke 19, and an hydraulic circuit is provided for driving secondary yoke 41 to drive primary yoke 19 to thereby positively pivot bogies 12 and 12' to thereby raise a desired one of the vehicle wheels. More specifically, secondary yoke 41 is keyed to inner shaft 42 (FIG. 2) by key 43, and secondary yoke 41 is secured on inner shaft 42 by nut 44. A spacer 45 is positioned between primary yoke 19 and secondary yoke 41. A bearing 46 is located between shafts 20 and 42.

The housing 47 of hydraulic clutch 48 is securely mounted on enlarged portion 29 of outer shaft 20 by a plurality of bolts 49 (only one shown). A plurality of annular discs 50 are keyed for axial but not rotary movement on housing 47 and are interdigitated with a plurality of discs 51 keyed for axial but not rotary movement on inner shaft 42. A nut 56 and a spacer 58 retain discs 51 on shaft 42. Normally discs 50 and 51 are not in driving contact with each other by virtue of the fact that pressurized hydraulic fluid is conducted by conduit 52 into chamber 53 to thereby move piston 54 to the right against the bias of a plurality of circumferentially spaced springs 55, only one of which is shown. Thus, outer shaft 20 can pivot freely relatively to inner shaft 42 because discs 50 and 51 are not forced into engagement with each other. However, when hydraulic pressure is relieved in conduit 52, springs 55 will expand to force discs 50 and 51 into firm contact with each other to thereby cause outer shaft 20 and inner shaft 42 to pivot in unison. A clutch of this type is commercially available and is known as a STROMAG SHB Multiple Disc Hydraulic Brake manufactured by Stromag, Inc. of Dayton, Ohio. While a specific type of hydraulic clutch has been depicted, it will be appreciated that any type of clutch which selectively couples and decouples outer shaft 20 and inner shaft 42 can be used.

Figure 5:
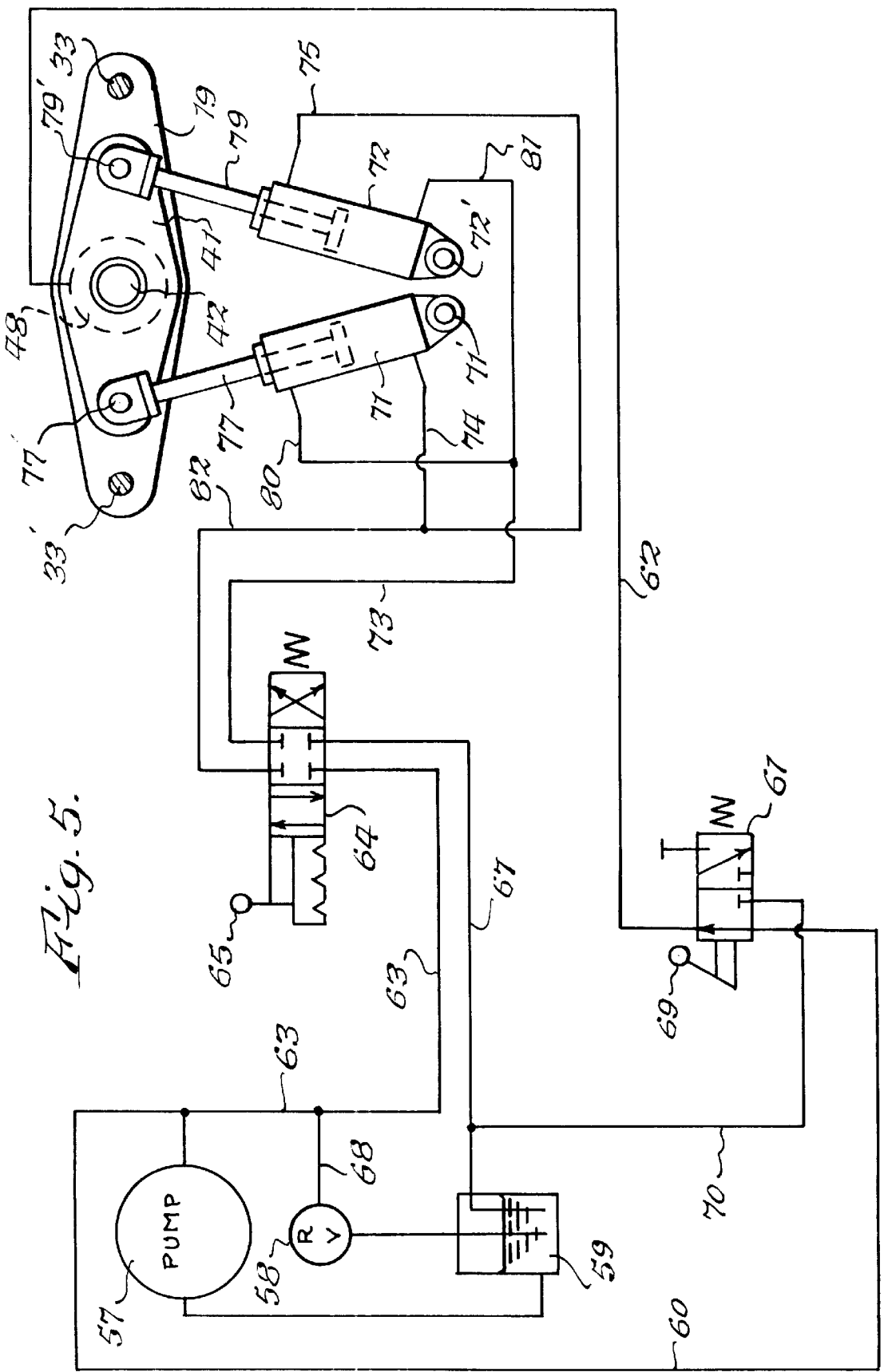
FIG. 5 is a schematic view showing the hydraulic circuit for coupling the secondary yoke to the primary yoke and for driving the secondary yoke.

An hydraulic circuit is schematically shown in FIG. 5 for selectively coupling and uncoupling the primary yoke 19 and secondary yoke 41, and this hydraulic circuit can be used to selectively pivot bogie 12 in a clockwise or counterclockwise direction to thereby raise the front wheel 15 or the rear wheel 15, respectively, while simultaneously lowering the front wheel 15' and raising the rear wheel 15', respectively, by simultaneously causing the pivoting of the bogie 12' in a counterclockwise or clockwise direction, respectively, as viewed from FIG. 1.

The hydraulic circuit of FIG. 5 operates in the following manner. The pump 57 operates at all times to conduct hydraulic fluid from sump 59 through conduit 60 and normally open valve 61 into conduit 62 leading to hydraulic clutch 48 to thereby cause discs 50 and 51 to be separated, which, in turn, permits primary yoke 19 to freely pivot in response to the pivotal movement of bogies 12 and 12' and it is not coupled to secondary yoke 41. At this time the hydraulic fluid will also pass from conduit 60 through conduit 63 to valve 64 which is in a neutral position, to thereby cause the hydraulic fluid to pass into conduit 68 leading to relief valve 58 and sump 59, and at this time the ends of conduits 73 and 82 will be blocked at valve 64. When the lever 69 of valve 61 is placed in an off position, the flow of hydraulic fluid through conduit 60 to conduit 62 will be terminated, and conduit 62 leading from hydraulic clutch 48 will be placed in communication with conduit 70 leading to sump 59, thereby causing springs 55 to activate clutch 48 to couple shafts 20 and 42 to couple yokes 19 and 41.

One end of secondary yoke 41 is pivotally connected at 77' to piston rod 77 of cylinder 71 which is pivotally connected to vehicle body 11 at 71', and the opposite end of yoke 41 is pivotally connected at 79' to piston rod 79 of cylinder 72 which is pivotally connected to vehicle body 11 at 72'.

When it is desired to positively drive the bogies 12 and 12', lever 69 is manipulated to terminate the flow of pressurized hydraulic fluid to clutch 48 and lever 65 is manipulated to provide pressurized hydraulic fluid to cylinders 71 and 72. In this respect, if it is desired to cause secondary yoke 41 to pivot in a clockwise direction in FIG. 5, the lever 65 is moved to a position whereby pressurized hydraulic fluid will flow from conduit 63 to conduit 82 and to conduits 74 and 75. This will cause piston rod 77 to move upwardly and piston rod 79 to move downwardly, thereby pivoting secondary yoke 41 in a clockwise direction. As noted above, at the same time the clutch 48 is engaged so that the clockwise rotation of secondary yoke 41 will cause clockwise rotation of primary yoke 19 which in turn will drive the front end of bogie 12 downwardly and raise the front end of bogie 12'. While pressurized fluid is being supplied to cylinders 71 and 72 through conduits 74 and 75, respectively, hydraulic fluid is being exhausted from cylinders 71 and 72 through conduits 80 and 81, respectively, which feed into conduit 73 which valve 64 places in communication with conduit 67 leading back to sump 59.

The hydraulic cylinders 71 and 72 are actuated by lever 65 for as long a time as is required to raise the front end of bogie 12 and the rear end of bogie 12' to any desired height, and when the bogies 12 and 12' reach their desired position, valve 64 can be placed in a neutral position, as shown in FIG. 5, wherein it blocks flow from conduits 73 and 82 so that the bogies remain locked in such a position. At this time hydraulic liquid from conduit 63 flows into conduit 68 leading to the sump 59. At this time valve 61 remains in a position to cause clutch 48 to lock yokes 19 and 41 together to maintain the bogies 12 and 12' to the position to which they have been moved.

When it is desired to pivot secondary yoke 41 in a counterclockwise direction in FIG. 5, lever 65 of valve 64 is moved to a position wherein conduit 63 leading from pump 57 is placed in communication with conduit 73 which in turn supplies cylinder 71 with hydraulic fluid through conduit 80 and supplies cylinder 72 with hydraulic fluid through conduit 81 while at the same time permitting conduits 75 and 74 to exhaust cylinders 72 and 71, respectively, through conduit 82, valve 64 and conduit 67. It can thus be seen that the bogies 12 and 12' can be each pivoted clockwise or counterclockwise by proper manipulation of valve 64. As noted above, when the bogies 12 and 12' reach their desired position, valve 64 is returned to a neutral position. At this time clutch 48 remains activated to maintain the bogies in the position to which they have been moved.

The foregoing description of the hydraulic circuit of FIG. 5 indicated how bogies 12 and 12' can be pivoted to any desired position either clockwise or counterclockwise and then held in such position to permit any one of the four wheels to be raised to a level wherein it can rise above an obstruction which would normally block it, such as a high wall. After the obstacle has been surmounted, the yokes 19 and 41 can be uncoupled by returning valve 61 to a position wherein hydraulic fluid is conducted from conduit 60 to conduit 62 to deactivate clutch 48 to thereby permit bogies 12 and 12' to pivot freely, and any pivotal motion transmitted to yoke 19 will not be transmitted to yoke 41. Also, at this time after yokes 19 and 41 have been uncoupled, valve 64 can be actuated to drive yoke 41 back to a central horizontal position in FIG. 5 so that it can be pivoted an equal amount in either opposite direction for moving the bogies after it has been moved to the central horizontal position.

Whenever the clutch 48 is actuated to couple yokes 19 and 41, the lever 65 of valve 64 can be manipulated in a rapid manner between its two actuating positions to alternately provide pressurized hydraulic fluid and exhaust to the upper and lower portions of cylinders 71 and 72. The alternate application of pressurized fluid to the upper and lower chambers of cylinders 71 and 72 in a rapid manner in any position to which bogies 12 and 12' have been moved will rapidly shift the weight of the vehicle among the four wheels to cause the wheels to produce a vertical pulsating action on their supporting terrain to thus provide improved traction over surfaces such as ice, mud, sand and snow.

If it is desired to apply a vertical pulsating action to the wheels 15 and 15' while permitting the wheels to follow the terrain, the valve 61 can be shifted rapidly between clutch actuating and deactuating positions simultaneously with the rapid shifting of valve 64 between its two actuating positions so that the bogies can pivot freely when the yokes 19 and 41 are not coupled. In this manner there will be a combined ability of the four wheels to follow the terrain while at the same time receiving a vertical pulsating action which improves traction. The amplitude and frequency of the pulsations is achieved by the speed of manipulating valve 64.

By way of further explanation, FIG. 7 schematically shows a 2,000 pound vehicle of the type depicted in FIG. 1 in normal operation wherein the weight is distributed equally to each of the four wheels so that each wheel bears 500 pounds of the load. However, by virtue of the mode of operation wherein the weight of the 2,000 pound vehicle is rapidly shifted, the weight can be momentarily shifted to a pair of diagonally opposite wheels such that the lower left and upper right wheel each bear 1,000 pounds of the load while the opposite diagonal set of wheels bear no load, as shown in FIG. 8. Thereafter, the weight of the vehicle can be momentarily shifted to the opposite set of diagonal wheels, as shown in FIG. 9, so that each wheel of such opposite set bears a load of 1,000 pounds while the opposite diagonal wheels carry no load. It will be appreciated that the foregoing shifting of weight can be rapid and momentary so that there can be numerous weight shiftings per minute. It can thus be seen that improved traction can be obtained by periodically causing alternate wheels to bear greater loads and alternate wheels to bear lesser loads, thereby permitting the wheels which bear greater loads to dig into the ground more positively while permitting the opposite wheels which carry lesser loads to ride more lightly along the surface of the ground on which the vehicle is traveling. In FIG. 10 another position is shown wherein the weight distribution is 750 pounds on each of one set of diagonal wheels and 250 pounds on each of another set of diagonal wheels. This represents a loading of the vehicle wheels in passing to the ultimate loading depicted in FIGS. 8 and 9 or it can be the ultimate loading which the vehicle wheels have if the shifting of the weight is sufficiently rapid so that the ultimate loading of FIGS. 8 and 9 is never reached. It is possible to shift the weight in any combination up to and including the ultimate loading of FIGS. 8 and 9. This process of shifting partial weights does not have to be rapid, although it can be, and any distribution of weights can be sustained for any length of time. Thus, by utilizing different combinations of weight shiftings, improved traction can be effected on practically infinite soil, snow and ice conditions. The foregoing procedure is applicable with regard to the all-terrain embodiment and the conventional vehicle embodiment described hereafter.

Figure 6:
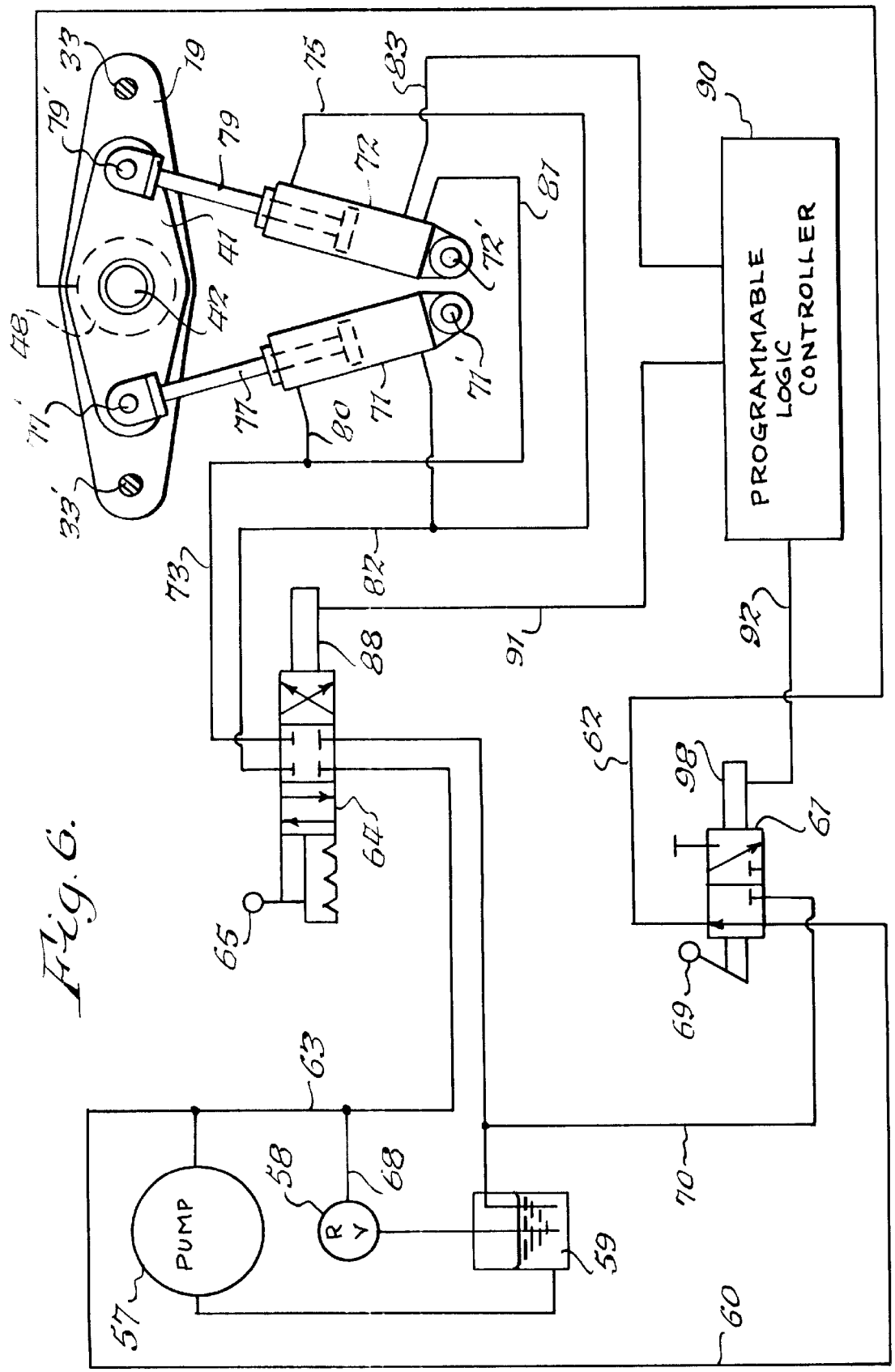
FIG. 6 is a schematic view similar to that shown in FIG. 5 and including a programmable logic controller.

In FIG. 6 a modified embodiment of the hydraulic circuit of FIG. 5 is shown wherein the only difference is that the action of the hydraulic circuit is governed by a properly programmed commercially available programmable logic controller 90 which is coupled to valve 64 by lead 91 and is coupled to valve 61 by lead 92 to selectively activate solenoids 88 and 98, respectively, associated with these valves to cause them to move to the above-described positions for the above-described purposes as desired. The numerals applied to FIG. 6 which are identical to those applied to FIG. 5 represent identical elements of structure, except as noted above. It will be appreciated that the programmable logic controller 90 constitutes a state-of-the-art device, and the program need not be described in detail other than to state that it can cause the various parts to perform the ultimate functions discussed in detail above.

Figure 11:
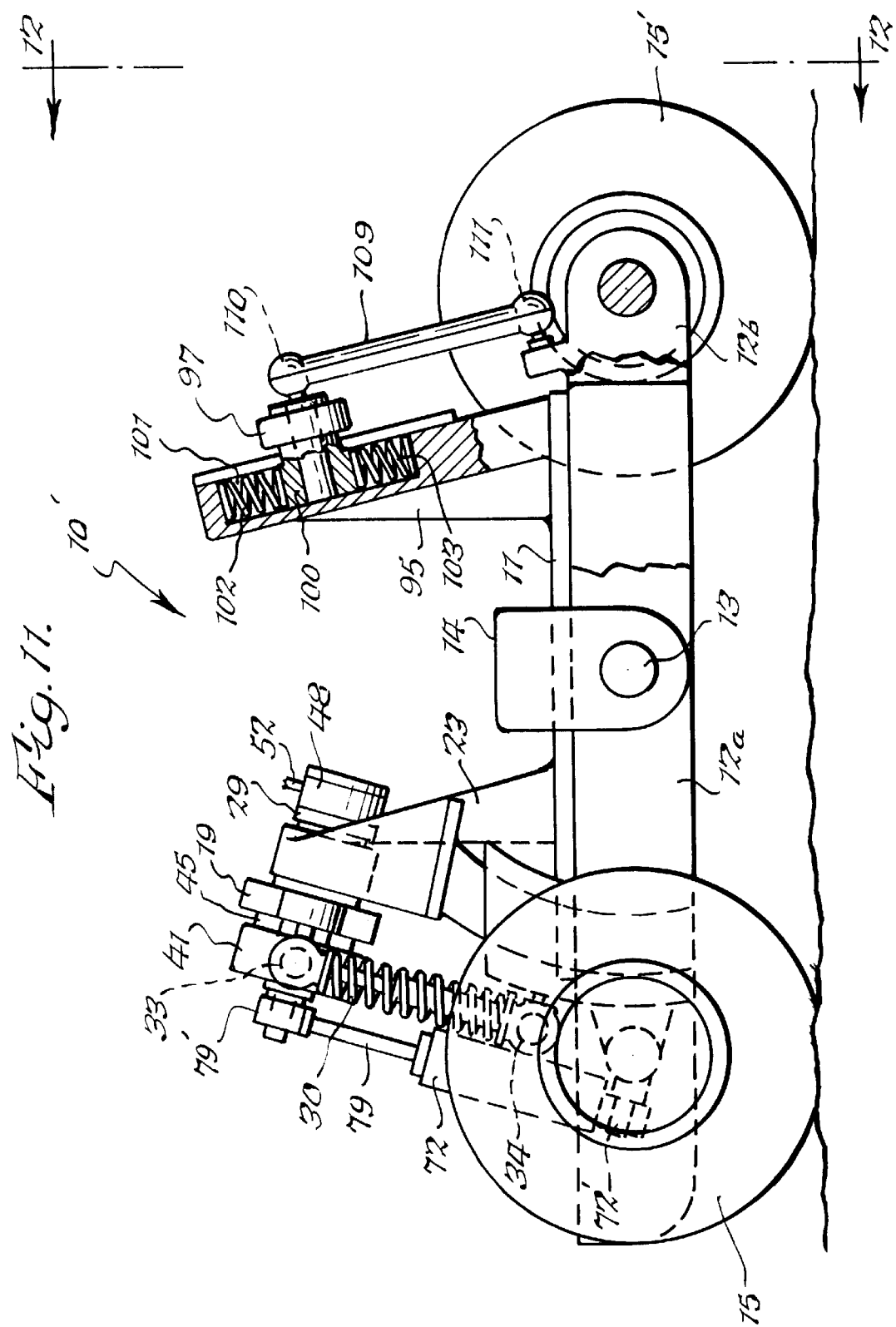
FIG. 11 is a side elevational view of an alternate embodiment of the present invention wherein both ends of each of the bogies are positively linked to the vehicle chassis.

In FIGS. 11 and 12 a modified construction of the vehicle is shown. The all-terrain vehicle 10' of FIGS. 11 and 12 can possess all of the structure and operate in an identical manner to the preceding embodiment described with respect to FIGS. 1–10. Accordingly identical numerals will be applied to those parts of the all-terrain vehicle 10' of FIGS. 11 and 12 which are identical to those elements of structure of the preceding figures. The only difference is that bogies 12a and 12b differ from bogies 12 and 12', respectively, by virtue of the fact that additional structure is provided to positively support the ends of the bogies 12a and 12b which are not coupled to standard 23. In this respect, a standard 95 extends upwardly from vehicle body 11, and it mounts a yoke 97 having a central portion 99 which is pivotally mounted on block 100 which is vertically slidable in opening 101 and is resiliently maintained in a centered position by springs 102 and 103. A link 104 has its upper end pivotally coupled to yoke 97 by ball joint 105 and it has its lower end coupled to bogie 12a by ball joint 107. A link 109 has its upper end coupled to yoke 97 by ball joint 110 and its lower end coupled to bogie 12b by ball joint 111. By virtue of the foregoing construction, both ends of each of the bogies 12a and 12b are positively supported on the vehicle body 11.

In FIGS. 13 and 14 a still further embodiment of the present invention is disclosed. The all-terrain vehicle 10" of FIGS. 13 and 14 can incorporate all of the features of all of the preceding figures except where it differs therefrom. In this respect, the main difference is that the bogies 12c and 12d are configured so that they have arms 115 and 117, respectively, which extend upwardly therefrom with their outer ends located above the centerlines of the wheels 15 and 15', respectively. Thus, yoke 19', which is analogous to yoke 19 of the preceding figures, has to be extended laterally so that its outer ends 119 and 120 are located above the centerlines of the vehicle wheels. Links 121 and 122, which are analogous to links 30 and 30' of FIG. 3, extend between yoke 19' and arms 115 and 117. Ball joints 123 and 124 are located at the opposite ends of link 121, and ball joints 125 and 127 are located at the opposite ends of link 122. Ball joints 123 and 125 are mounted on the opposite ends of yoke 19' and ball joints 124 and 127 connect the lower ends of links 121 and 122, respectively, to the upper ends of arms 115 and 117, respectively. Yoke 19' is mounted on standard 23' which extends upwardly from vehicle body 11. Standard 23' is analogous to standard 23 of FIGS. 1–4. Hydraulic cylinders 71' and 72' are analogous to hydraulic cylinders 71 and 72, respectively, of FIGS. 1–4 except that they are of a different size so as to fit into the different configuration of FIGS. 13 and 14. The secondary yoke 41' is analogous to secondary yoke 41 of FIGS. 1–4. The primed numerals associated with cylinders 71' and 72' and yoke 41' represent analogous structure denoted by unprimed numerals of FIGS.

1–4, and it is therefore believed that a detailed description of such structure is unnecessary.

In FIGS. 15–17 a modification of the above described system of FIG. 6 is applied to a normal four-wheeled vehicle such as an automobile or truck wherein the wheels are independently suspended.

In FIG. 15 a vehicle frame 140 is shown on which wheels 141, 142, 143 and 144 are independently suspended. Only wheel 141 is shown in FIG. 16, but it will be appreciated that wheels 142–144 can be suspended in a similar manner or in any other suitable manner. Insofar as pertinent here, a cylindrical frame 145 is welded to the vehicle frame at 147. A cylindrical plate 149 is guided for vertical movement in frame 147. A strut 150 is provided below plate 149. The lower portion of strut 150 consists of shock absorber 151, the lower portion of which is suitably secured to the upper portion 152 of arm 153. The upper portion 154 of shock absorber 151 is suitably secured to plate 149. A spring 155 has its lower portion secured to shock absorber 151 at 157 and its upper portion bears against bracket 159 which is secured to plate 149. A hydraulic cylinder 160 has its lower end 161 secured to the upper portion of plate 149, and the piston rod 162 of cylinder 160 terminates at a rubber ball joint bushing 163 which is mounted on portion 148 of frame 140. The remainder of the linkage coupled between the frame and wheel 141 is conventional and unnumbered.

A hydraulic circuit which is controlled by a suitably programmed programmable logic controller 165 controls each of wheels 141, 142, 143 and 144 as described hereafter in FIG. 17. The inlet of pump 167 is in communication with sump 169 through conduit 170. Pump 167 runs continually, and its outlet can return to sump 169 via conduits 171 and 172, relief valve 173, conduit 174 and conduit 175. Hydraulic cylinder 160 of FIGS. 15 and 16 is in communication with valve 177 via conduits 179 and 180. Valve 177 is the same type of valve as valve 64 shown in FIG. 5 wherein it can either block conduits 179 and 180 or supply cylinder 160 with hydraulic fluid through either conduit 179 or 180 while causing the other of these conduits to exhaust the cylinder 160. More specifically, if it is desired to raise wheel 141, valve 177 is moved to a position wherein there is pressurized fluid flowing from conduit 171 through conduit 181, valve 177 and conduit 179 to cylinder 160 while placing conduit 180 in communication with conduit 182 which is in communication with conduit 175 leading to sump 169. This will cause cylinder 160 to rise upwardly on piston rod 162 and lift plate 149 in frame 145 with it and thus lift the wheel 141. When valve 177 is returned to a central position, the hydraulic fluid will be locked in cylinder 160 on opposite sides of the piston therein and thus wheel 141 will be maintained in the position to which it was moved by cylinder 160. When it is desired to lower wheel 141, valve 177 is moved to a position wherein it effects communication from conduit 171 through conduit 181 to conduit 180 while placing conduit 179 in communication with conduit 182 leading to conduit 175 which flows to sump 169. This will cause cylinder 160 to be driven downwardly in FIG. 16 and thus carry plate 149 downwardly to move strut 150 downwardly to thus lower wheel 141.

Valves 185, 187 and 189 are identical to valve 177. Valve 185 is coupled to a cylinder 190 which controls a strut, such as 150 shown in FIG. 16, which is associated with vehicle wheel 142. Valve 187 is associated with a cylinder 191 which is associated with a strut such as 150 shown in FIG. 16 which is coupled to wheel 144. Valve 189 is associated with a cylinder 192 which is coupled to a strut such as 150 shown in FIG. 16 which is associated with wheel 143.

If it is desired to raise wheel 142, valve 185 places conduit 193 in communication with conduit 194 to thereby supply hydraulic fluid to cylinder 190 and thus raise cylinder 190 to lift a plate, such as 149, and thus raise wheel 142. At this time exhaust fluid from cylinder 190 will flow through conduit 195, valve 185 and conduit 197 to conduit 175 leading to sump 169. Once wheel 142 has reached its desired position, valve 185 is returned to a neutral position wherein it locks the hydraulic fluid on the opposite sides of the piston. When it is desired to lower wheel 142, valve 185 is placed in a position wherein pressurized hydraulic fluid is supplied to cylinder 190 through conduits 194 and 195 while hydraulic fluid is exhausted from cylinder 190 through conduits 193 and 197.

Cylinder 191 is used to raise and lower wheel 144 which is coupled to cylinder 191 through a strut such as 150 shown in FIG. 16. In this respect, when it is desired to raise wheel 144, valve 187 is moved to a position wherein there is flow of pressurized fluid from conduit 171 through conduit 198, valve 187 and through conduit 199 to cylinder 191 while fluid is exhausted from cylinder 191 via conduit 200, valve 187 and conduit 201. This will cause cylinder 191 to ride upwardly on its piston and raise wheel 144 with it. When it is desired to lower wheel 144, valve 187 is moved to a position wherein there is communication between conduits 198 and 200 to provide pressurized fluid to cylinder 191 while fluid is exhausted from cylinder 191 via conduits 199 and 201. As with the above cylinders, when valve 187 is returned to a neutral position, the hydraulic fluid is locked in cylinder 191 to maintain the wheel 144 to the position to which it was last moved.

When it is desired to raise wheel 143, valve 189 is moved to a position wherein there is a flow of pressurized fluid through conduit 203, valve 189 and conduit 204 to cylinder 192 while fluid is exhausted from cylinder 192 via conduit 205, valve 189 and conduit 207. This will raise cylinder 192 and also raise wheel 143 which is coupled to cylinder 192 through a strut such as 150 shown in FIG. 16. When it is desired to lower wheel 143, valve 189 is moved to a position wherein pressurized hydraulic fluid is supplied to cylinder 192 via conduit 205 while fluid is exhausted from cylinder 192 via conduits 204 and 207. As with the above cylinders, when valve 189 is returned to a neutral position, the hydraulic fluid is locked in cylinder 192 to maintain wheel 143 to the position to which it has been raised or lowered.

It will be appreciated that each of valves 177, 185, 187 and 189 can be controlled manually to raise or lower diagonal pairs of wheels. This manual control may be effected through a mechanical linkage or through the programmable logic controller 165 which is coupled to the foregoing valves through electrical lead lines 210, 211, 212 and 213, respectively, which are coupled to solenoids 214, 215, 216 and 217, respectively. It will thus be appreciated that diagonally opposite wheels can be raised or lowered simultaneously without lowering or raising, respectively, the other pair of diagonally opposite wheels. For example, if desired, wheels 142 and 143 may be raised or lowered simultaneously without in any way affecting wheels 141 and 144. Also, if desired, diagonal wheels 141 and 144 can be raised or lowered simultaneously without affecting wheels 142 and 143.

In addition to the foregoing, the programmable logic controller 165 can actuate the various cylinders to provide vertical pulsations to each of the wheels individually or to all of the wheels, simultaneously or to any combination of the wheels, such as possibly vertically pulsating only wheels 143 and 144 or only pulsating wheels 141 and 142. Also, a pair of diagonally opposite wheels can be pulsated while not pulsating the other pair of diagonally opposite wheels. In fact, there can be any combination of vertical pulsations of the wheels through the action of the programmable logic controller which causes the valves controlling each of the cylinders associated with the wheels to function accordingly. In this respect, the pulsation is effected, for example, with valve 177 by rapidly reciprocating it back and forth to rapidly reverse the flow of hydraulic fluid to cylinder 160. The same would occur with respect to other of the valves 185, 187 and 189.

In addition to the foregoing, the programmable logic controller can cause any of the valves to cause their associated wheels to be raised or lowered while other of the wheels are being vertically pulsated. Thus, for example, it might be desirable to raise wheel 141 while lowering wheel 144 and simultaneously pulsating wheels 143 and 142. Also, it may be desirable to vertically pulsate one pair of diagonal wheels while pulsating the other pair of diagonal wheels. Thus, here again, there can be any combination of raising and lowering of certain wheels while pulsating other of the wheels.

In addition to the foregoing, vertical pulsating movement can be applied to any one of the wheels while it is being raised or lowered. Thus, for example, wheel 141 which is controlled by cylinder 160, can be raised and pulsated simultaneously by causing valve 177 to intermittently move to effect raising and intermittently reciprocating valve 177 to effect pulsations. Thus, any one of the wheels can be simultaneously raised and pulsated or lowered and pulsated. Thus, for example, wheel 141 can be raised and pulsated while wheel 144 is lowered and pulsated and while wheels 142 and 143 are merely pulsated without being raised or lowered. Also, diagonal pairs of wheels can be raised or lowered and simultaneously vertically pulsated. Also, one pair of diagonal wheels can be pulsated while the other pair is raised or lowered. Thus, here again there are infinite combinations of raising, lowering and pulsating the wheels.

While the above description relative to FIGS. 1–6 has shown an hydraulic circuit for selectively driving the primary yoke 19, it will be appreciated that the motors can be of any type including but not limited to electric motors and pneumatic motors, and that the clutch can be of any type including but not limited to electrical, magnetic or mechanical clutches.

While preferred embodiments of the present invention have been disclosed, it will be appreciated that the present invention is not limited thereto but may be otherwise embodied within the scope of the following claims.

What is claimed is:

1. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, first connecting means movably connecting said second outer end portions of said yoke to said first ends of said elongated links, second connecting means movably connecting said first outer ends of said bogies to said second ends of said elongated links, and selectively actuatable motor means for positively pivoting said yoke to thereby positively pivot said bogies coupled to said yoke to thereby move all of said wheels simultaneously.

2. A vehicle as set forth in claim 1 wherein said motor means is hydraulic.

3. A vehicle as set forth in claim 1 including actuating means associated with said motor means for selectively applying a pulsating action to said bogies to effect a vertical pulsating action to said wheels.

4. A vehicle as set forth in claim 1 wherein said motor means include means for raising a wheel to a selectable height and maintaining said wheel at said height.

5. A vehicle as set forth in claim 1 including a second yoke pivotally mounted crosswise to said body, and wherein said selectively actuatable motor means are coupled between said body and said second yoke, and clutch means for selectively coupling said second yoke to said yoke to thereby positively pivot said bogies coupled to said yoke when said selectively actuatable motor means is actuated.

6. A vehicle as set forth in claim 1 including a second yoke pivotally mounted crosswise to said body, and wherein said selectively actuatable motor means are coupled between said body and said second yoke, and clutch means for selectively coupling said second yoke to said yoke to thereby positively pivot said bogies coupled to said yoke when said selectively actuatable motor means is actuated, and wherein said second yoke includes outer ends, and wherein said selectively actuatable motor means comprise first and second hydraulic cylinders coupled between said outer ends of said second yoke and said body.

7. A vehicle as set forth in claim 1 including a second yoke pivotally mounted crosswise to said body, and wherein said selectively actuatable motor means comprise an hydraulic cylinder coupled between said second yoke and said body.

8. A vehicle as set forth in claim 1 wherein said vehicle includes first and second ends, and wherein said standard is mounted proximate said first end of said body, and wherein said bogies are connected to said first elongated links proximate said first end of said body, a second standard mounted proximate said second end of said body, a second yoke pivotally mounted on said second standard and extending crosswise of said body, outer end portions on said second yoke, second elongated links having first and second ends, third connecting means movably connecting said outer end portions of said second yoke to said first ends of said second elongated links, and fourth connecting means movably connecting said bogies to said second ends of said second elongated links proximate said second end of said body.

9. A vehicle as set forth in claim 1 wherein said second connecting means are located substantially above certain of said wheels.

10. A vehicle as set forth in claim 1 wherein said bogies include laterally extending arms at certain of said first ends of said bogies, outer ends on said laterally extending arms located substantially above certain of said wheels, and wherein said second connecting means are located at said outer ends of said laterally extending arms.

11. A vehicle as set forth in claim 4 including actuating means associated with said motor means for selectively applying a pulsating action to said bogies.

12. A vehicle as set forth in claim 5 wherein said second yoke includes outer ends, and wherein said selectively actuatable motor means comprise first and second hydraulic cylinders coupled between said outer ends of said second yoke and said body.

13. A vehicle as set forth in claim 12 including means for causing said first and second cylinders to apply a pulsating action to said second yoke to apply a pulsating action to said bogies to effect a vertical pulsating action to said wheels.

14. A vehicle as set forth in claim 12 including a hydraulic circuit coupled to said first and second hydraulic cylinders for actuating said first and second cylinders to pivot said bogies for moving one of the wheels mounted thereon to a desired position.

15. A vehicle as set forth in claim 6 including means for causing said first and second cylinders to apply a pulsating action to said second yoke to apply a pulsating action to said bogies to effect a vertical pulsating action to said wheels.

16. A vehicle as set forth in claim 15 including a hydraulic circuit coupled to said first and second hydraulic cylinders for actuating said first and second cylinders to pivot said bogies for moving one of the wheels mounted thereon to a desired position.

17. A vehicle as set forth in claim 7 including means for causing said hydraulic cylinder to apply a pulsating action to said second yoke to apply a pulsating action to said bogies to effect a vertical pulsating action to said wheels.

18. A vehicle as set forth in claim 7 including a hydraulic circuit coupled to said hydraulic cylinder for actuating said hydraulic cylinder to pivot said second yoke for moving one of the wheels mounted on one of said bogies to a desired position.

19. A vehicle as set forth in claim 8 wherein said second yoke is also resiliently mounted for vertical movement on said second standard.

20. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, laterally extending arms having first and second ends, first connecting means movably connecting said second outer end portions of said yoke to said first ends of said elongated links, said first outer ends of said bogies being connected to said first ends of said laterally extending arms, said second ends of said elongated links being connected to said second ends of said laterally extending arms, and said second ends of said laterally extending arms being located substantially over certain of said wheels.

21. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a standard on said body, a yoke having a second central portion and second outer end portions with said second central portion pivotally mounted on said standard and said yoke extending crosswise of said body, elongated links having first and second ends, first connecting means movably connecting said second outer end portions of said yoke to said first ends of said elongated links, second connecting means movably connecting said first outer ends of said bogies to said second ends of said elongated links, and wherein said vehicle includes first and second ends, and wherein said standard is mounted proximate said first end of said body, and wherein said bogies are connected to said first elongated links proximate said first end of said body, a second standard mounted proximate said second end of said body, a second yoke pivotally mounted on said second standard and extending crosswise of said body, outer end portions on said second yoke, second elongated links having first and second ends, third connecting means movably connecting said outer end portions of said second yoke to said first ends of said second elongated links, and fourth connecting means movably connecting said bogies to said second ends of said second elongated links proximate said second end of said body.

22. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a yoke having a second central portion and second outer end portions with said second central portion pivotally mounted on said body and said yoke extending crosswise of said body, elongated links movably connecting said yoke to said bogies, and a selectively actuatable motor effectively coupled to said yoke for pivoting said bogies to thereby move all of said wheels simultaneously.

23. A vehicle as set forth in claim 22 wherein said motor is hydraulic.

24. A vehicle as set forth in claim 22 including a pulsator member coupled to said motor.

25. A vehicle as set forth in claim 22 wherein said actuatable motor drives said bogies to raise a wheel to a selectable height and maintain said wheel at said height.

26. A vehicle as set forth in claim 22 including a second yoke pivotally mounted crosswise to said body, and wherein said selectively actuatable motor is coupled between said body and said second yoke, and a clutch selectively coupling said second yoke to said yoke to thereby positively pivot said bogies coupled to said yoke when said selectively actuatable motor is actuated.

27. A vehicle as set forth in claim 22 including a pivotable member mounted on said body, and wherein said selectively actuatable motor is coupled between said body and said pivotable member, and a clutch selectively coupling said pivotable member to said yoke, and wherein said pivotable member includes an outer end, and wherein said selectively actuatable motor comprises an hydraulic cylinder coupled between said outer end of said pivotable member and said body.

28. A vehicle as set forth in claim 22 including a pivotable member mounted on said body, and wherein said selectively actuatable motor is coupled between said pivotable member and said body.

29. A vehicle as set forth in claim 22 wherein said body includes first and second ends, and wherein said yoke is mounted proximate said first end of said body, a second yoke pivotally mounted proximate said second end of said body, and connected to said bogies.

30. A vehicle as set forth in claim 22 wherein said yoke is connected to said bogies substantially above certain of said wheels.

31. A vehicle as set forth in claim 22 wherein said bogies include laterally extending arms, outer ends on said laterally extending arms located substantially above certain of said wheels, and wherein said yoke is connected to said outer ends of said laterally extending arms.

32. A vehicle as set forth in claim 25 including a pulsator member coupled to said motor.

33. A vehicle as set forth in claim 26 wherein said second yoke includes outer ends, and wherein said selectively actuatable motor comprises first and second hydraulic cylinders coupled between said outer ends of said second yoke and said body.

34. A vehicle as set forth in claim 33 including a pulsator member coupled to said first and second cylinders.

35. A vehicle as set forth in claim 33 including a hydraulic circuit coupled to said first and second hydraulic cylinders for actuating said first and second cylinders to pivot said bogies for moving one of the wheels mounted thereon to a desired position.

36. A vehicle as set forth in claim 27 including a pulsator member coupled to said hydraulic cylinder.

37. A vehicle as set forth in claim 36 including a hydraulic circuit coupled to said hydraulic cylinder for actuating said cylinder to pivot said bogies for moving one of the wheels mounted thereon to a desired position.

38. A vehicle as set forth in claim 28 including a pulsator member for causing said selectively actuatable motor to apply a pulsating action to said pivotable member to apply a pulsating action to said bogies to effect a vertical pulsating action to said wheels.

39. A vehicle as set forth in claim 28 including an actuating circuit for actuating said selectively actuatable motor for pivoting said pivotable member.

40. A vehicle as set forth in claim 29 wherein said second yoke is resiliently mounted for vertical movement on said body.

41. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a yoke having a second central portion and second outer end portions with said second central portion pivotally mounted on said body and said yoke extending crosswise of said body, laterally extending arms having inner ends connected to certain end portions of said bogies, outer ends on said laterally extending arms located substantially over certain of said wheels, and said yoke being connected to said outer ends of said laterally extending arms.

42. A vehicle comprising a body, bogies each having a first central portion and first outer end portions with said first central portions of said bogies pivotally mounted on opposite sides of said body for free pivotal movement, wheels mounted on said first outer end portions of said bogies, said free pivotal movement of said bogies occurring as said wheels mounted thereon follow the terrain, a first yoke having a second central portion and second outer end portions with said second central portion pivotally mounted on said body and said first yoke extending crosswise of said body, first connections between said first yoke and said bogies, said vehicle including first and second ends, and wherein said first yoke is mounted proximate said first end of said body, and wherein said bogies are connected to said first yoke proximate said first end of said body, a second yoke pivotally mounted proximate said second end of said body and extending crosswise of said body, second connections between said second yoke and said bogies, and a selectively actuatable motor effectively connected to said first yoke.

43. A vehicle comprising a body, elongated members pivotally mounted on opposite sides of said body for free pivotal movement, an outer end portion on each of said elongated members, a wheel mounted on said outer end portion of each of said elongated members, said free pivotal movement of said elongated members occurring as said wheels mounted thereon follow the terrain, a linkage mounted on said body and movably connected to said elongated members, a programmable logic controller, and a selectively actuatable motor effectively coupled relative to said programmable logic controller and said linkage for moving said elongated members.

44. A vehicle as set forth in claim 43 wherein said programmable logic controller causes said linkage to pulsate said elongated members.

45. A vehicle as set forth in claim 43 wherein said programmable logic controller causes said actuatable motor to drive at least one of said elongated members to raise a wheel to a selectable height and maintain said wheel at said height.

46. A vehicle as set forth in claim 45 wherein said programmable logic controller causes said linkage to pulsate said elongated members.

47. A vehicle comprising a body, bogies each having a central portion and outer end portions with said central portions of said bogies pivotally mounted on opposite sides of said body for pivotal movement, wheels mounted an outer end portions of said bogies, a programmable logic controller, and means coupling said programmable logic controller to a pulsatable linkage connecting said first and second bogies.

48. A vehicle comprising a body, bogies each having a central portion and outer end portions with said central portions of said bogies pivotally mounted on opposite sides of said body for pivotal movement, wheels mounted on said outer end portions of said bogies, a linkage connecting said bogies, and a motor for pivoting said bogies in opposite directions through said linkage to move all of said wheels simultaneously.

49. A vehicle comprising a body, bogies each having a central portion and outer end portions with said central portions of said bogies pivotally mounted on opposite sides of said body for pivotal movement, wheels mounted on said outer end portions of said bogies, said pivotal movement of said bogies occurring as said wheels mounted thereon follow the terrain so that diagonally opposite ends of said bogies simultaneously move in the same direction, a linkage coupled to each of said bogies and a motor coupled to said linkage for pulsating all of said wheels simultaneously.

\* \* \* \* \*